A. P. STROHMENGER.
ELECTRIC DEPOSITION OF METALS.
APPLICATION FILED APR. 11, 1912.
1,041,525.
Patented Oct. 15, 1912.
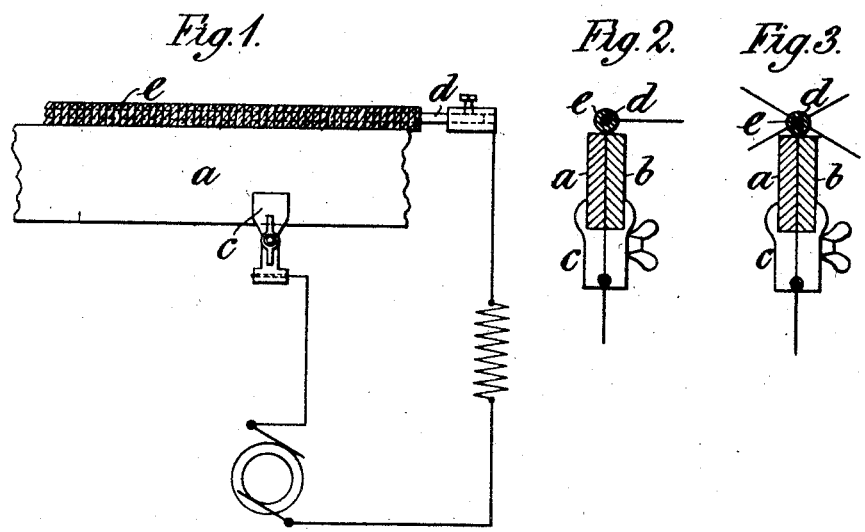

UNITED STATES PATENT OFFICE.

ARTHUR PERCY STROHMENGER, OF WESTMINSTER, LONDON, ENGLAND.

ELECTRIC DEPOSITION OF METALS.

1,041,525.  Specification of Letters Patent.  Patented Oct. 15, 1912.

Application filed April 11, 1912. Serial No. 690,124.

*To all whom it may concern:*

Be it known that I, ARTHUR PERCY STROHMENGER, a subject of the King of Great Britain, residing at Caxton House, Westminster, London, England, have invented new and useful Improvements in the Electric Deposition of Metals, of which the following is a specification.

The usual method of depositing metal by means of the electric arc or of electric welding is to hold the electrode in the hand, to place it in contact with the work, and to withdraw it, thus starting the arc, and then to move the electrode along the work. Now in practice when using a metal electrode it is difficult to hold the electrode quite steady and to move it along at a uniform and correct distance from the work, and this is especially the case in small work such for instance as barrel welding when the current employed must be comparatively small and therefore the arc is short.

According to this invention I secure the electrode which is suitably coated with some fusible insulating covering upon the work and along the whole length of the line along which the metal is to be deposited or of the seam to be welded. The covering should be of such a thickness that the metal electrode is supported by it at the proper distance from the work.

The accompanying drawing illustrates the invention.

Figure 1 is a side view and Fig. 2 a cross section. Fig. 3 is a view similar to Fig. 2 but showing a modification.

*a b* are two pieces of metal to be welded together; they are supported in a vise or clamp *c* and are connected to one pole of a source of alternating current. *d* is the electrode connected to the other pole of such source and coated with fusible insulating material *e*.

It is in many cases advantageous to lay two or more conductors side by side as shown in Fig. 3 and to connect them in parallel so that two or more arcs are formed, the resulting streams of metal uniting. The weld produced by such an arrangement is more regular than when the electrode consists of a single conductor. In such a case it is not necessary to insulate each one of the conductors separately.

The insulating material which I prefer to use is asbestos spun into the form of a yarn and smeared with a suitable composition such as sodium silicate, aluminum silicate and the like to vary the fusing temperature of the yarn; and the asbestos which I find to answer best is blue asbestos which is a ferrous silicate and acts rather as a reducing than as an oxidizing agent so that it must effectually prevent oxidation of the deposited metal.

The thickness of the material *e* will depend upon the size of the electrode and the strength of the current, the greater the current the thicker being the material.

The electrode may be secured in position by tying it to the work with string or by other convenient means. The end of the electrode is bared and an arc is struck by a piece of carbon or other convenient means; the arc fuses the covering and melting the electrode moves slowly along the seam. The fused covering acts as a flux and prevents the molten metal coming in contact with the air, thus preventing porosity.

When welding an alloy it usually happens that there is a greater loss from the crater area *i. e.* that part of the work which is intensely heated of one or more of the constituents of the alloy than of the remainder, so that the composition of the resulting metal is not quite the same as that of the work. This loss which is dependent upon the current density can be determined beforehand and I therefore form the electrode of an alloy which contains an amount of such constituent or constituents in excess of the amount required in the resulting metal, the excess being equal to the amount lost. For instance in welding steel there is a loss of carbon and I therefore use an electrode having a greater carbon content than is required in the resulting metal, the excess being equal to the loss from the crater area which can be predetermined beforehand. Similarly if the steel contain vanadium for instance, I use an electrode containing a suitable excess of that metal.

What I claim is:—

1. A process of depositing metal by means of the electric arc, which comprises connecting the work to one pole of a source of electric current, laying an insulated metal electrode along the line on which metal is to be deposited, connecting this electrode to the other pole of the source of current, and striking an arc between the work and the end of the electrode.

2. A process of depositing metal by means of the electric arc, which comprises connecting the work to one pole of a source of electric current, laying a plurality of insulated metal conductors forming an electrode along the line on which metal is to be deposited, connecting these conductors in parallel to the other pole of the source of current, and striking an arc between the work and the ends of the electrode.

3. A process of depositing metal by means of the electric arc, which comprises connecting the work to one pole of a source of electric current, laying a metal electrode covered with asbestos yarn along the line on which metal is to be deposited, connecting this electrode to the other pole of the source of current, and striking an arc between the work and the end of the electrode.

4. A process of depositing an alloy by means of the electric arc which comprises connecting the work to one pole of a source of electric current, laying along the line on which alloy is to be deposited an insulated electrode of an alloy which contains an excess of one of the constituents of the work, connecting this electrode to the other pole of the source of current, and striking an arc between the work and the end of the electrode.

5. A process of electric welding, which comprises placing the two pieces of metal to be welded side by side, connecting them to one pole of a source of electric current, laying an insulated metal electrode along the seam, connecting this electrode to the other pole of the source of current, and striking an arc between the work and the end of the electrode.

6. A process of electric welding, which comprises placing the two pieces of metal to be welded side by side, connecting them to one pole of a source of alternating electric current, laying an insulated metal electrode along the seam, connecting this electrode to the other pole of the source of current, and striking an arc between the work and the end of the electrode.

7. A process of electric welding, which comprises placing the two pieces of metal to be welded side by side, connecting them to one pole of a source of electric current, laying a plurality of insulated metal conductors forming an electrode along the seam, connecting these conductors in parallel to the other pole of the source of current and striking an arc between the work and the ends of the electrode.

8. A process of electric welding, which comprises placing the two pieces of metal to be welded side by side, connecting them to one pole of a source of electric current, laying a metal electrode covered with asbestos yarn along the seam, connecting this electrode to the other pole of the source of current and striking an arc between the work and the end of the electrode.

9. A process of electric welding, which comprises placing the two pieces of metal to be welded side by side, connecting them to one pole of a source of electric current, laying a metal electrode covered with blue asbestos yarn along the seam, connecting this electrode to the other pole of the source of current and striking an arc between the work and the end of the electrode.

10. A process of electric welding, which comprises placing the two pieces of metal to be welded side by side, connecting them to one pole of a source of alternating electric current laying a plurality of insulated metal conductors forming an electrode along the seam, connecting these conductors in parallel to the other pole of the source of current and striking an arc between the work and the ends of the electrode.

11. A process of electric welding which comprises placing the two pieces of metal to be welded side by side, connecting them to one pole of a source of electric current, laying along the seam an insulated electrode of an alloy which contains an excess of one of the constituents of the pieces to be welded, connecting this electrode to the other pole of the source of current, and striking an arc between the work and the end of the electrode.

ARTHUR PERCY STROHMENGER.

Witnesses:
W. SLAUGHTER,
O. J. WORTH.